United States Patent
Andou et al.

(10) Patent No.: US 8,096,608 B2
(45) Date of Patent: Jan. 17, 2012

(54) WORKING VEHICLE WITH TILT FLOOR

(75) Inventors: Takenobu Andou, Kawagoe (JP); Katsumi Yokoo, Kawagoe (JP); Shinichi Itou, Kawagoe (JP)

(73) Assignees: Komatsu Ltd., Tokyo (JP); Komatsu Utility Co., Ltd., Tokyo (JP)

( * ) Notice: Subject to any disclaimer, the term of this patent is extended or adjusted under 35 U.S.C. 154(b) by 624 days.

(21) Appl. No.: 11/883,131

(22) PCT Filed: Jan. 30, 2006

(86) PCT No.: PCT/JP2006/001430
§ 371 (c)(1),
(2), (4) Date: Feb. 2, 2009

(87) PCT Pub. No.: WO2006/080488
PCT Pub. Date: Aug. 3, 2006

(65) Prior Publication Data
US 2010/0301635 A1 Dec. 2, 2010

(30) Foreign Application Priority Data

Jan. 31, 2005 (JP) .................................. 2005-024304

(51) Int. Cl.
*B62D 33/067* (2006.01)
(52) U.S. Cl. .............. 296/190.05; 180/89.14; 180/89.18
(58) Field of Classification Search ............. 296/190.05, 296/190.04; 180/89.14, 89.15, 89.16, 89.18, 180/89.19
See application file for complete search history.

(56) References Cited

U.S. PATENT DOCUMENTS

| 4,253,700 | A  | * | 3/1981 | Di Francescantonio . 296/190.05 |
| 6,454,035 | B1 |   | 9/2002 | Waskow et al. |
| 7,162,816 | B2 | * | 1/2007 | Otsuka et al. ................... 37/347 |
| 2004/0172863 | A1 |   | 9/2004 | Otsuka et al. |

FOREIGN PATENT DOCUMENTS

| EP | 1 413 683  | 4/2004  |
| JP | 58-3386    | 6/1979  |
| JP | 56-91174   | 12/1979 |
| JP | 58-26864   | 6/1983  |
| JP | 58-111675  | 7/1983  |
| JP | 60-143185  | 7/1985  |
| JP | 61-199485  | 12/1986 |
| JP | 62-127077  | 8/1987  |

(Continued)

OTHER PUBLICATIONS

Office Action issued in corresponding Chinese Application No. 200680003517X and English translation thereof, 4 pages.

(Continued)

*Primary Examiner* — Joseph Pape
(74) *Attorney, Agent, or Firm* — Fish & Richardson P.C.

(57) ABSTRACT

In a working vehicle having a tilt floor, a torsion bar has one end mounted on the tilt floor and the other end thereof mounted on a base frame, and is disposed on the tilt floor which is tilted up and down relative to the base frame. In a maximally opened position where the tilt floor is tilted up and a closed position where the tilt floor is tilted down, a position of a barycenter (G) of the tilt floor on which the driving room (C) is disposed is opposite from each other relative to a turning center of the tilt floor across the top dead center.

2 Claims, 12 Drawing Sheets

FOREIGN PATENT DOCUMENTS

| | | |
|---|---|---|
| JP | 62-143576 | 9/1987 |
| JP | 2-57784 | 4/1990 |
| JP | 4-102678 A | 4/1992 |
| JP | 07-101359 | 4/1995 |
| JP | 9-016095 A | 1/1997 |
| JP | 2000-72048 | 3/2000 |

OTHER PUBLICATIONS

English translation of Notification of Reasons for Rejection issued Mar. 25, 2011 in Japanese Application No. JP2007-500621 (3 pages).

* cited by examiner (a)

(b)

WORKING VEHICLE WITH TILT FLOOR

TECHNICAL FIELD

The present invention relates to a working vehicle such as a hydraulic shovel having a tilt floor which can be tilted up and down.

BACKGROUND ART

Conventionally, a working vehicle such as a hydraulic shovel employs a tilt floor structure in which a floor where an operator carries out an excavation operation can be tilted up and down for securing an operation space required for maintenance and inspection, etc. around an engine.

Mounted on the tilt floor of this kind is a driving room such as an ROPS canopy employing a roll over protective structure (so called ROPS structure) and a cab where an operator can carry out operation without being drenched with rain even in the rain. The driving room such as the ROPS canopy and the cab can be exchanged and mounted on the tilt floor if necessary.

As a mechanism for assisting a tilting action relative to the tilt floor, an actuator such as a torsion bar, a hydraulic cylinder and a gas spring is used and the torsion bar and the actuator are appropriately selected or combined to be used.

Patent documents 1 and 2 propose techniques using a torsion bar as a mechanism for assisting the tilting action. Patent document 3 proposes a technique using a hydraulic cylinder.

Patent Document 1: Japanese Utility Model Publication No. 58-26864
Patent Document 2: Microfilm of Japanese Utility Model Application No. 61-14667 (Japanese Utility Model Laid-open Publication No. 62-127077)
Patent Document 3: Japanese Patent Application Laid-open Publication No. 60-143185

DISCLOSURE OF THE INVENTION

Problem to be Solved by the Invention

In a working vehicle having a tilt floor, for example, in a large hydraulic shovel heavier than 1.5 tons, the tilt floor is tilted up and an opening angle of the tilt floor is set to about 35°. In this case, an operator can put his or her upper-body into an opening formed by the tilting up action and can carry out the maintenance and inspection, etc., and an operation space necessary for the maintenance and inspection, etc. can sufficiently be secured.

However, for example, a small hydraulic shovel having the weight of 1.5 tons or less has disadvantages that, even if the tilt floor is tilted up about 30°, the opening formed by the tilting up action can not be large since the vehicle body is small. Therefore, it is difficult for an operator to put his or her upper-body into the opening to carry out the maintenance and inspection, etc., and the operation space necessary for operation such as the maintenance and inspection can not easily be secured. Thus, even if the working vehicle has the tilt floor, the operation such as the maintenance and inspection can not easily be carried out.

In view of the above-described problem in the working vehicle, it is an object of the present invention to provide a working vehicle having a tilt floor which can easily tilt up and down the tilt floor and largely enhance the operability of maintenance and inspection, etc.

Means for Solving the Problem

To achieve the above object, the first invention of the present application provides a working vehicle comprising a torsion bar having one end mounted on a base frame and the other end mounted on a tilt floor, in which the tilt floor can be tilted up and down relative to the base frame, wherein a position of a barycenter of the tilt floor having a driving room when the tilt floor is tilted up and assumed to be at a maximally opened position passes a top dead center relative to a turning center of the tilt floor, and a neutral position of the torsion bar is between the maximally opened position and a closed position where the tilt floor is tilted down.

According to the second invention of the application, supporting and fixing structures of the torsion bar are limited in a configuration of the first invention.

According to the third invention of the application, tilt-assisting means for assisting a tilting up operation and a tilting down operation of the tilt floor is arranged in the configuration of the first or second invention.

According to the fourth invention of the application, mounting angle adjusting means capable of adjusting a mounting angle of the torsion bar is arranged in the configuration of any of the first to third inventions.

Effect of the Invention

According to the first invention of the application, the position of the barycenter of the tilt floor having the driving room such as the ROPS canopy and the cab can be moved between both sides with respect to the top dead center around the turning center of the tilt floor. That is, when the tilt floor is tilted up from the closed position to the maximally opened position, the barycenter position of the tilt floor passes the top dead center relative to the turning center of the tilt floor, and can move at a location opposite from the closed position with the top dead center interposed therebetween.

When the tilt floor is tilted down from the maximally opened position to the closed position, the barycenter position of the tilt floor can be returned to the closed position while passing the top dead center relative to the turning center of the tilt floor.

When the tilt floor is tilted up to the maximally opened position in this manner, the barycenter position of the tilt floor having the driving room is opposite from the closed position with the top dead center interposed therebetween. Therefore, it is possible to secure sufficient opening angle of the tilt floor and to secure a wide operation space for the maintenance and inspection, etc.

The neutral position of the torsion bar in a state where there is no torsion deformation is between the closed position where the tilt floor is tilted down and the maximally opened position where the tilt floor is tilted up. For this reason, when the tilt floor is tilted up and the barycenter position of the tilt floor having the driving room reaches a position beyond the top dead center from the closed position, it is possible to apply an assisting force to the tilt floor from the torsion bar in a direction where the tilt floor is tilted down.

That is, when the barycenter position of the tilt floor having the driving room passes the top dead center from the closed position, it is possible to apply an assisting force to the tilt floor from the torsion bar for returning the tilt floor toward the closed position.

When the tilt floor having the driving room is tilted up from the closed position, it is possible to apply an assisting force to the tilt floor from the torsion bar in a direction in which the tilt floor is tilted up.

It is possible to smoothly and easily tilt up and down the tilt floor by the assisting force from the torsion bar in this manner.

According to the configuration of the second invention of the application, it is possible to freely select the mounting position of the torsion bar, and to obtain a mounting configuration of the torsion bar having a high freedom degree of design.

According to the configuration of the third invention of the application, it is possible to utilize an assisting force from the tilt-assisting means in addition to the assisting force from the torsion bar. This makes it possible to more smoothly tilt up and down the tilt floor.

According to the configuration of the fourth invention of the application, it is possible to adjust the mounting angle of the torsion bar, and to adjust the torsion amount of the torsion bar, i.e., the assisting force from the torsion bar. It is also possible to change the neutral position of the torsion bar where there is no torsion deformation by adjusting the mounting angle adjusting means.

With this configuration, it is possible to effectively utilize the assisting force of the torsion bar and the assisting force from the tilt-assisting means, and it is also possible to prevent an operation force of an operator required for tilting up and down the tilt floor from being excessively increased. Further, the tilt floor can be smoothly tilted up and down by a stable operation force of the operator.

Figure 1:
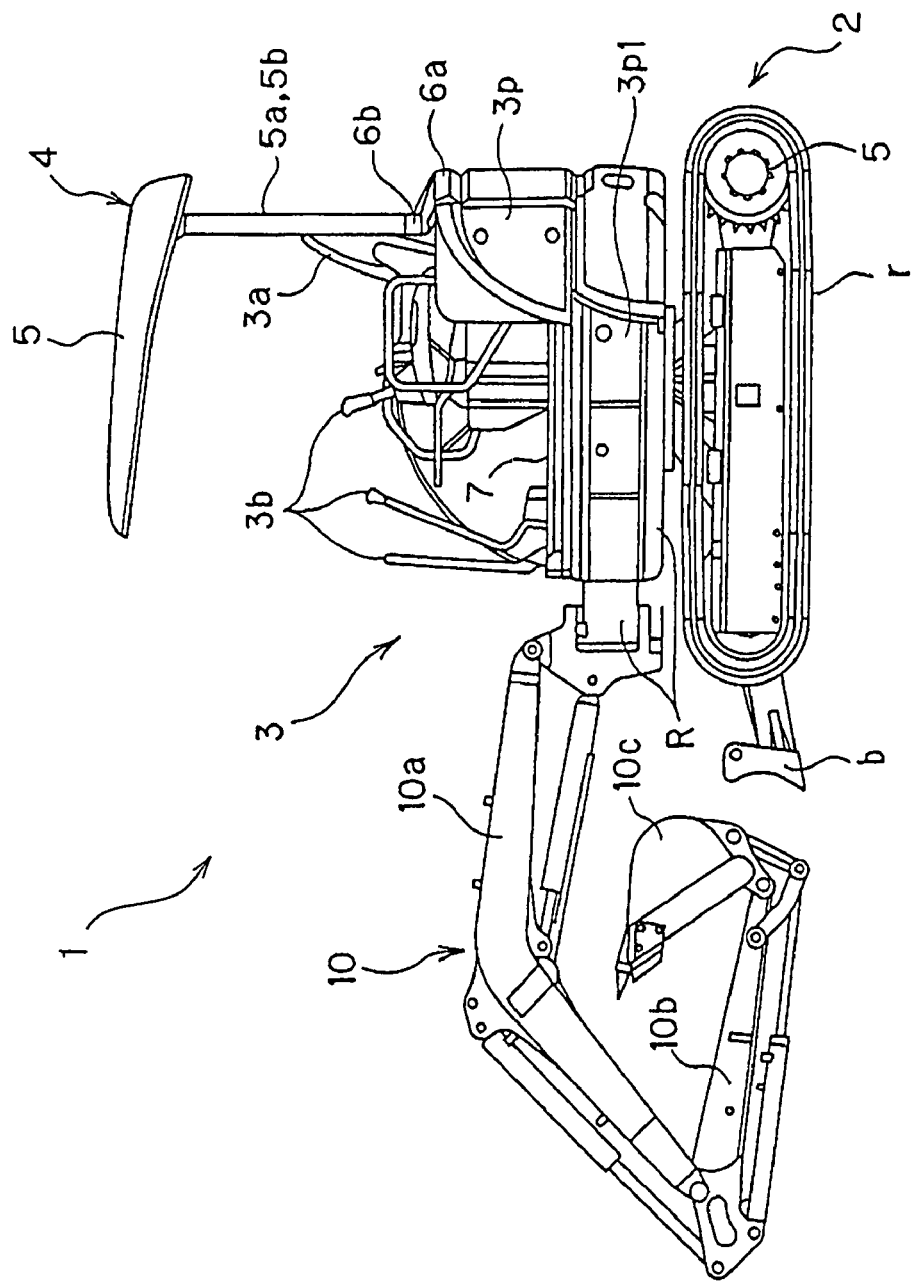
FIG. 1 is a side view of a hydraulic shovel (first embodiment).

EXPLANATION OF SYMBOLS 1 hydraulic shovel (working vehicle)
4 canopy
7 floor (tilt floor)
7r2 torsion bar receiving member (receiving member)
8 gas spring (tilt-assisting means)
9 torsion bar
9a upper edge portion of torsion bar
9b intermediate portion of torsion bar
9c lower edge portion of torsion bar
C cab
G barycenter of floor on which cab is disposed (barycenter of tilt floor on which cab is disposed)
R revolving frame (base frame)
s spacer (mounting angle adjusting means)

BEST MODE FOR CARRYING OUT THE INVENTION

Embodiments of the present invention will be explained with reference to the accompanying drawings.

First Embodiment

As a working vehicle 1 according to the embodiment of the present invention, a small hydraulic shovel having weight of 1.5 tons or less will be taken as an example in the following explanation. However, the invention is not limited to a working vehicle having the weight of 1.5 or less, especially a hydraulic shovel, and the invention can also be applied to various working vehicles having weight greater than 1.5 tons.

FIG. 1 is a side view of a small hydraulic shovel. As shown in FIG. 1, a caterpillar r for moving and running is wound around a lower running body 2. An upper turning body 3 is turnably mounted on an upper portion of the lower running body 2. An operator rides on the upper turning body 3 for carrying out operation.

A blade b is provided on a front portion of the lower running body 2 so as to be swingable. The blade b can move in a predetermined manner as an earth-removing plate when soil dug by a bucket 10c is returned.

A driving room constituted by a canopy 4 is disposed in the upper turning body 3. An operator seat 3a is disposed in the canopy 4. An operator sits on the operator seat 3a and carries out operation. A plurality of operation levers 3b is disposed around the operator seat 3a for operating a working machine 10 or controlling a running state of the hydraulic shovel 1.

The working machine 10 includes a hydraulically driven boom 10a, an arm 10b and the excavating bucket 10c mounted on a tip end of the arm 10b. The working machine 10 is disposed in front of the upper turning body 3. The working machine 10 is pivotally supported so as to be vertically rockable, and is supported such that the working machine 10 can horizontally turn around a support shaft disposed in the vertical direction.

The canopy 4 constituting the driving room supports and fixes a roof 5 by a pair of left and right columns 5a and 5b, and connects lower ends of the columns 5a and 5b by means of a second mounting seat plate 6b. The second mounting seat plate 6b is fixed to a first mounting seat plate 6a to which an exterior panel 3p is fixed.

An engine is accommodated in the exterior panel 3p below the operator seat 3a. A tilt floor 7 is a floor of the driving room. The tilt floor 7 is supported with respect to a revolving frame R which is a base frame of an upper turning body 2 such that the tilt floor 7 can tilt and turn. Hydraulic valves, a turning motor for turning the upper turning body 3 with respect to the lower running body 2, and pipes are disposed in a lower exterior panel 3p1 below the tilt floor 7 and on the revolving frame R.

The hydraulic shovel 1 having the above-described configuration operates a hydraulic pump by a driving force of the engine, and operates various actuators which drive a running hydraulic motor and the working machine 10 by hydraulic pressure outputted from the hydraulic pump.

Figure 2:
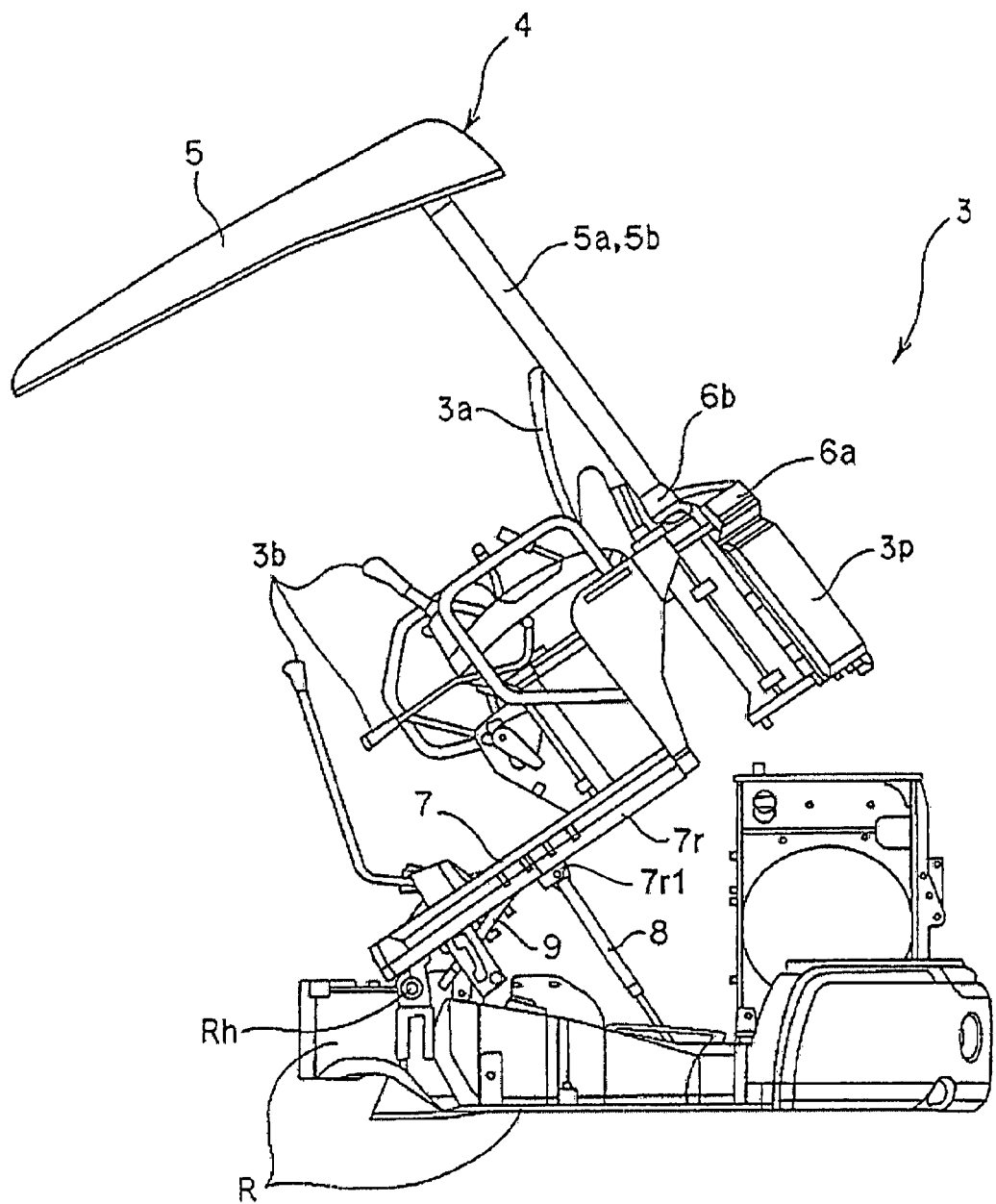
FIG. 2 is a side view showing a state where a floor of the hydraulic shovel is tilted up (first embodiment).

As shown in FIG. 2, the tilt floor 7 has a step as viewed from a side, a floor plate of the operator seat 3a is formed in a front portion thereof, and a central vertical wall plate covering a front surface of the engine below the operator seat 3a is constituted at a central portion of the tilt floor 7. A rear upper wall plate covering an upper portion of the engine is constituted on a rear side.

Figure 3:
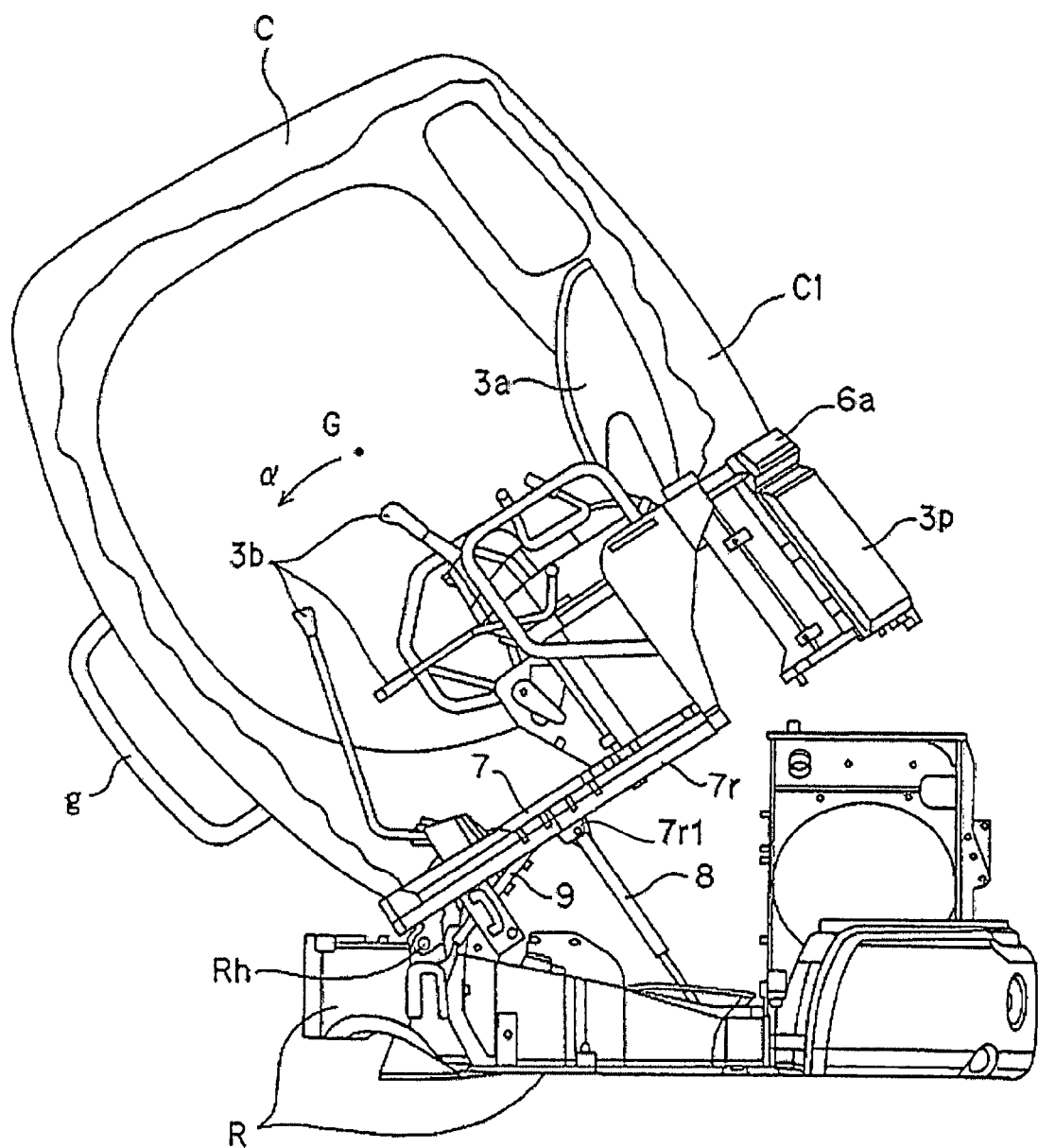
FIG. 3 is a partially cut-away sectional side view showing a state where a cab is disposed on the floor of the hydraulic shovel and the floor is tilted up (first embodiment).

FIG. 3 shows an example in which a cab C is used instead of the canopy 4 as a driving room disposed on the tilt floor 7.

As shown in FIGS. 2 and 3, a front end of the tilt floor 7 is supported by a hinge mechanism Rh formed on the revolving frame R such that the tilt floor 7 can turn with respect to the revolving frame R. With this configuration, the tilt floor 7 can be tilted up and down with respect to the revolving frame R with the hinge mechanism Rh as a center thereof.

That is, when the normal operation is carried out using the hydraulic shovel 1 or when the working vehicle runs, the tilt floor 7 is tilted down at its closed position and the operation of the working machine is carried out or the working vehicle runs. When operation such as maintenance and inspection is carried out for the hydraulic shovel 1, the tilt floor 7 is tilted up to the maximally opened position, and the operation such as the maintenance and inspection is carried out as shown in FIGS. 2 and 3.

At the closed position where the tilt floor 7 is tilted down, the tilt floor 7 is held at the closed position by lock means (not shown). At the maximally opened position where the tilt floor 7 is tilted up, the tilt floor 7 is retained to a stopper (not shown) and held at the maximally opened position.

The cab C can be supported by and fixed to the tilt floor 7 by fixing a rear end Cl of the cab C to the first mounting seat plate 6a. A grip g is disposed at a front portion of the cab C, and if an operator grasps the grip g and pushes or pulls the grip g, a force for tilting up and down the tilt floor 7 can be applied to the cab C.

To apply the assisting force when tilting up and down the tilt floor 7, a gas spring 8 as tilt-assisting means is disposed between a back surface 7r of the tilt floor 7 and the revolving frame R, as shown in FIGS. 2 and 3.

Figure 4:
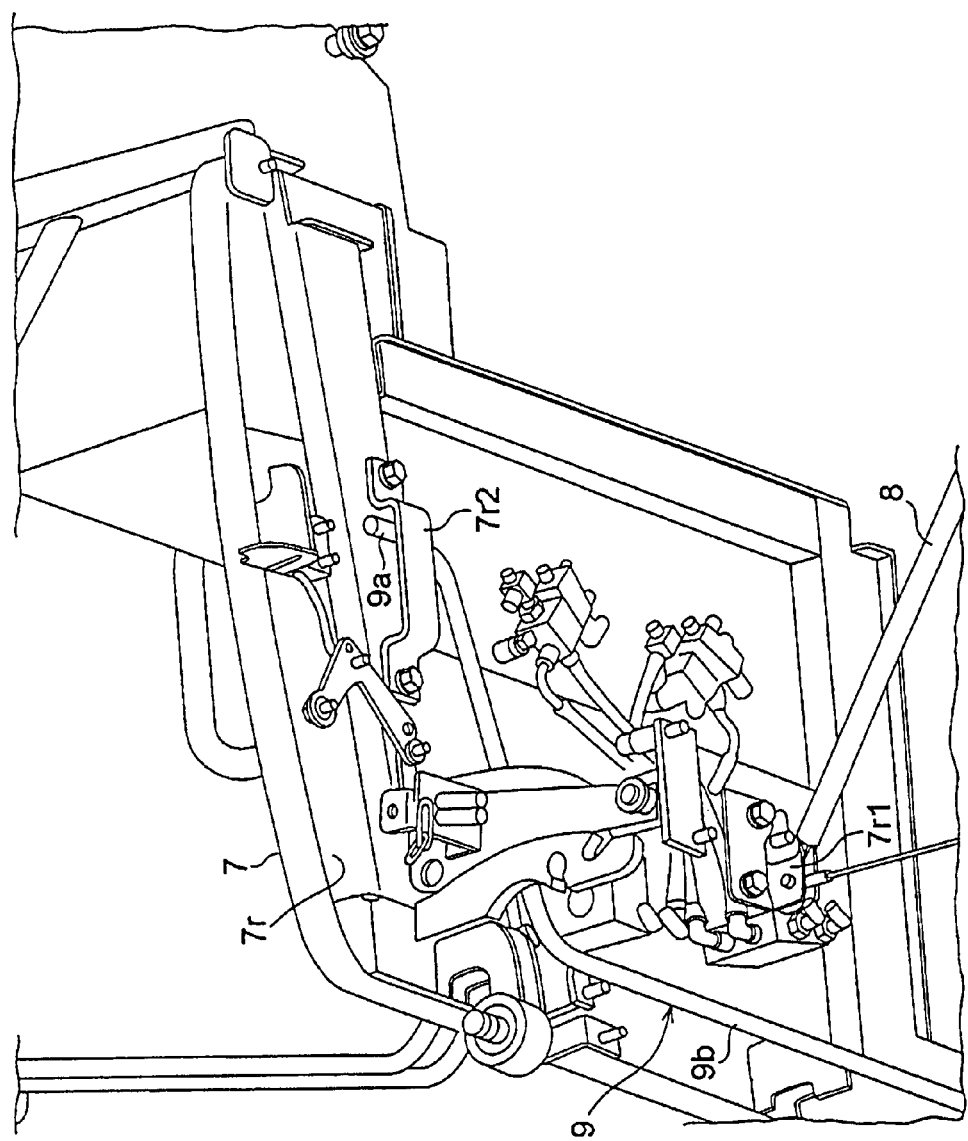
FIG. 4 is a perspective view of an essential portion of the floor of the hydraulic shovel as viewed from below (first embodiment).
Figure 5:
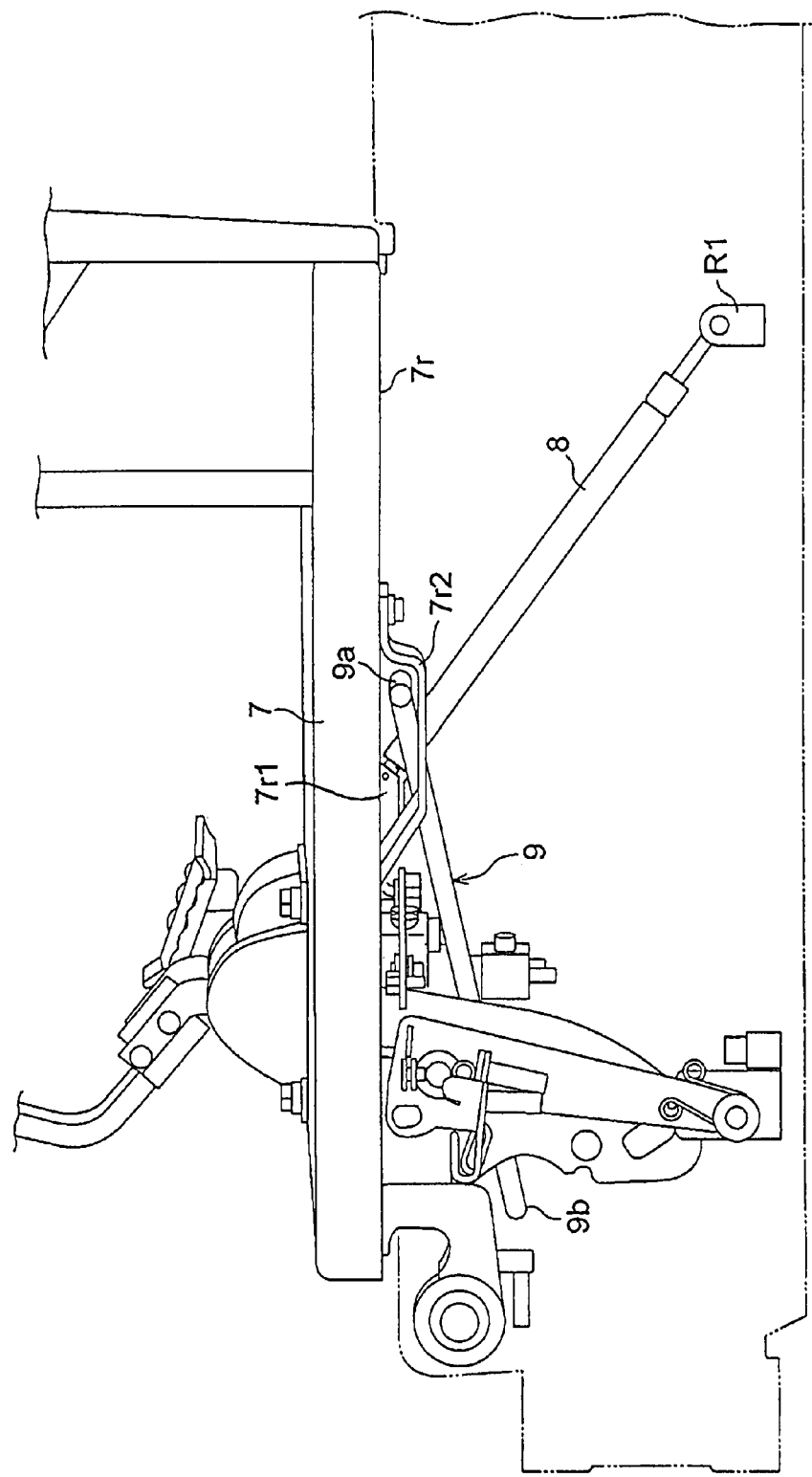
FIG. 5 is a side view of an essential portion below the floor of the hydraulic shovel (first embodiment).

FIG. 5 is a side view of an essential portion below the tilt floor 7. As a configuration of the gas spring 8, one end of the gas spring 8 is turnably supported by a mounting bracket R1 fixed to the revolving frame R as shown in FIG. 5. FIG. 4 is a perspective view of a bottom of an essential portion below the tilt floor 7. The other end of the gas spring 8 is turnably supported by a mounting bracket 7r1 fixed to the back surface 7r of the tilt floor 7 as shown in FIG. 4.

When the tilt floor 7 is tilted up and down with this configuration, the gas spring 8 can assist a turning motion of the tilt floor 7 irrespective of the tilting angle of the tilt floor 7, i.e., an angle position of the opening angle of the tilt floor 7.

Even in a state where the gas spring 8 tilts the tilt floor 7 up or down to a predetermined angle from the closed position, the gas spring 8 can always give the assisting force for turning the tilt floor 7.

Although the gas spring 8 is used as the tilt-assisting means for assisting the turning motion of the tilt floor 7 in this embodiment, assisting means such as a compression spring and a hydraulic cylinder which is hydraulically operated can also be used instead of the gas spring 8.

In the case of a small hydraulic shovel (working vehicle) 1 having the weight of about 1.5 tons or less, its vehicle body is made small. For this reason, in the working vehicle 1 of the embodiment, the maximum opening angle in the maximally opened position when the tilt floor 7 is tilted up is set to 50°. In FIG. 3, the maximum opening angle when the tilt floor 7 is tilted up is 50°.

By setting the maximum opening angle to 50°, it is possible to secure a sufficient operation space for the maintenance and inspection, etc. in an opening formed on the lower side of the tilt floor 7 into which an operator puts his or her upper-body.

When the tilt floor 7 having the cab C is tilted up at an opening angle of 50° with respect to the revolving frame R, the position of the barycenter G of the tilt floor 7 on which the cab C is disposed moves from a right closed position to a left position beyond the top dead center around the hinge mechanism Rb which is a turning center of the revolving frame R as shown in FIG. 3.

That is, when the position of the barycenter G of the tilt floor 7 on which the cab C is disposed is on a side of the closed position on a right side of the hinge mechanism Rh which is the turning center of the revolving frame R in FIG. 3, moment in a direction in which the tilt floor 7 is tilted down is applied by a load of the tilt floor 7 on which the cab C is disposed. That is, clockwise moment in FIG. 3 is applied to the tilt floor 7 in FIG. 3.

When the barycenter G reaches the left side of the hinge mechanism Rh beyond the top dead center in FIG. 3, moment in a direction in which the tilt floor 7 is tilted up is applied by the load of the tilt floor 7 on which the cab C is disposed. That is, counterclockwise moment in the direction of the arrow α in FIG. 3 is applied to the tilt floor 7, and the tilt floor 7 is turned in a direction in which the opening formed in the lower surface of the tilt floor 7 is further increased.

When the tilt floor 7 is tilted up to the maximally opened position, the tilt floor 7 is retained to a stopper (not shown) by its own weight, and the tilt floor 7 is prevented from further turning beyond the maximally opened position.

In an explanation of the embodiment of the present invention, the maximum opening angle when the tilt floor 7 is tilted up is 50°. However, the maximum opening angle when the tilt floor 7 is tilted up is not limited to 50°. The present invention can be applied to a working vehicle in which the position of the barycenter of the tilt floor 7 when a driving room such as the cab C is disposed in the maximum opening angle position can be moved in the opposite side from the closed position beyond the top dead center from a side of the closed position.

Thus, the maximum opening angle can be set to such an angle that the position of the barycenter of the tilt floor 7 having the driving room disposed at the maximally opened position passes through the top dead center from the closed position to a position opposite from the closed position.

When the tilt floor 7 is tilted down and returned from the maximally opened position to the closed position through the top dead center, it is necessary to apply such a moment that overcomes the counterclockwise moment shown with the arrow a in FIG. 3 to the tilt floor 7 on which the cab C is disposed until the tilt floor 7 is turned to the top dead center position from the maximally opened position.

Even if the assisting force by compression of the gas spring 8 is obtained, it is necessary for an operator to apply the moment which overcomes the counterclockwise moment shown with the arrow α to the tilt floor 7 on which the cab C is disposed by means of an operation force f applied to the grip g. The force in a tangent direction with the hinge mechanism Rh as a center thereof to be generated by the operator at the fulcrum of the grip g is called operation force f, hereinafter.

When the cab C is tilted down to the closed position from the maximally opened position through the top dead center, an excessive labor load caused by the weight of the tilt floor 7 on which the cab C is disposed is applied to the operator.

Also when the position of the barycenter of the tilt floor 7 on which the cab C is mounted becomes a position exceeding the top dead center which is opposite from the closed position around the turning fulcrum by the hinge mechanism Rh, a configuration capable of tilting down the tilt floor 7 without applying an excessive labor load to an operator is required.

Figure 7:
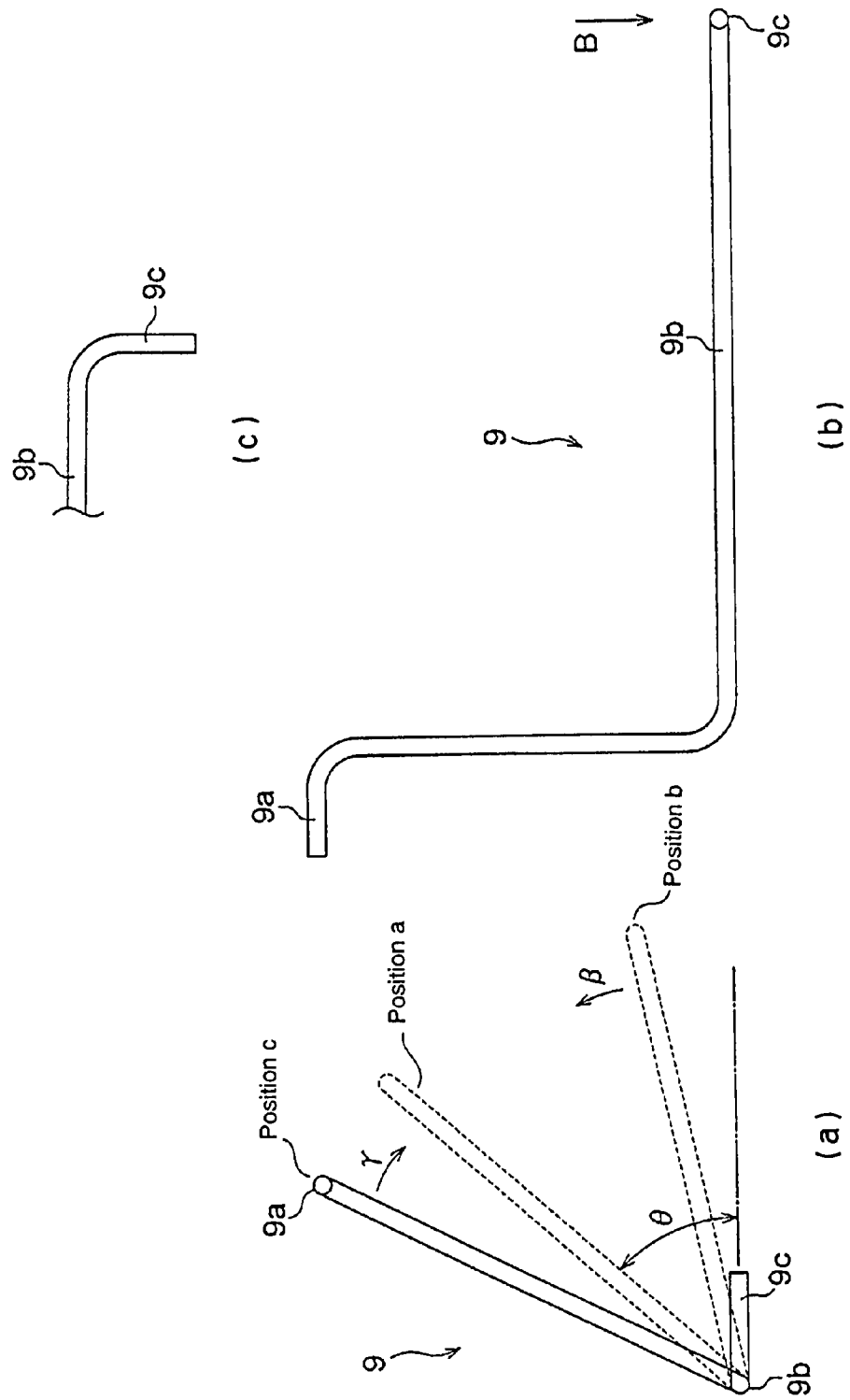
FIGS. 7(a) and 7(b) are a side view and a rear view of a torsion bar.
FIG. 7(c) is a view taken along an arrow B in FIG. 7(b) (first embodiment).

In the present invention, in addition to the assisting means by the gas spring 8, a torsion bar 9 shown in FIG. 7 is used as the assisting means for tilting up and down the tilt floor 7. FIG. 7(a) is a side view of the torsion bar 9, FIG. 7(b) is a rear view of the torsion bar 9, and FIG. 7(c) is a view taken along a X direction in FIG. 7(b).

Figure 6:
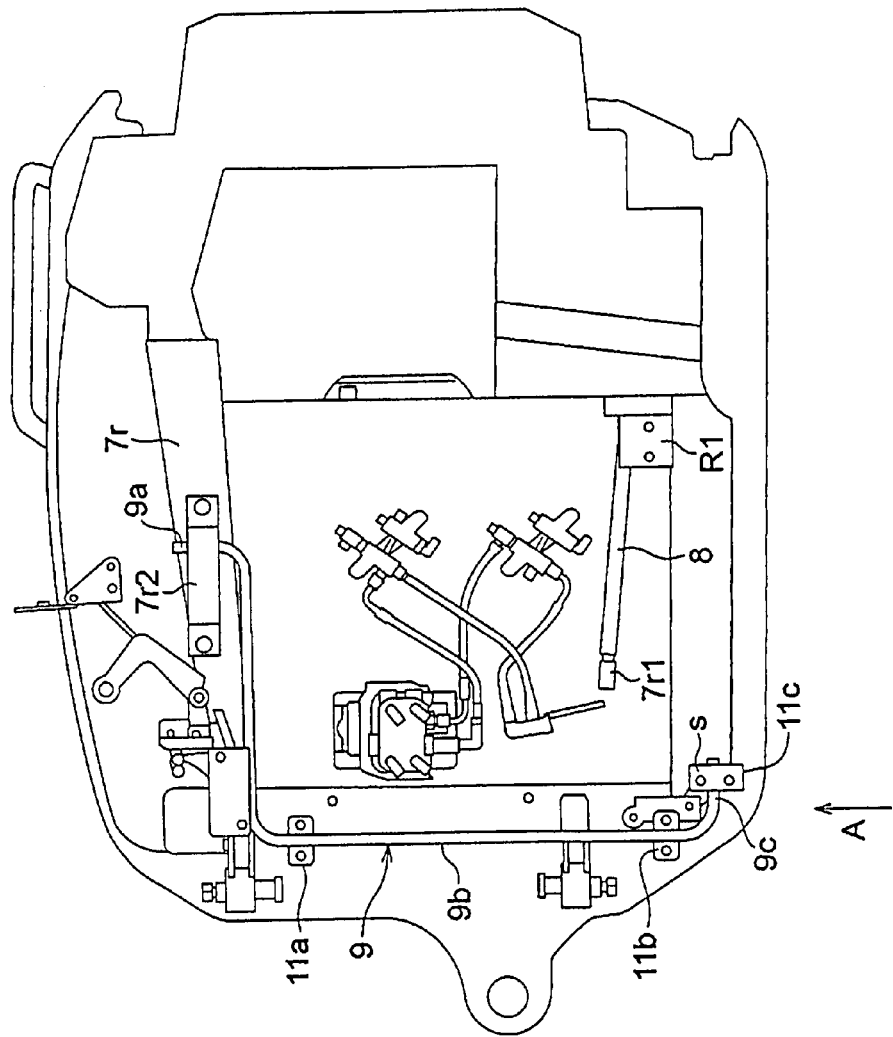
FIG. 6 is a bottom view of an essential portion below the floor of the hydraulic shovel (first embodiment).

The torsion bar 9 is formed using a spring steel of φ21 mm, for example. As shown in FIGS. 4 to 6, the torsion bar 9 is disposed between the revolving frame R and the back surface 7r of the tilt floor 7. An assisting force for tilting up and down the tilt floor 7 is applied by utilizing torsion of the torsion bar 9, i.e., a force generated when the twisting of the torsion bar 9 is returned and a reaction force when the twisting is applied to the torsion bar 9.

The above-described material and a diameter of the torsion bar 9 are only examples, and the material and the diameter of the torsion bar of the invention are not limited to the above-described values.

If, as shown in FIG. 7(a), an upper edge portion 9a of the torsion bar 9 is located at a position a when a lower edge portion 9c of the torsion bar 9 is fixed, the torsion bar 9 can not be twisted or deformed. That is, the position a is a neutral position.

With this configuration, when the upper edge portion 9a of the torsion bar 9 is located between a position b and the position a, the torsion in the direction of the arrow 13 in FIG. 7(a) is generated in the torsion bar 9. When the upper edge portion 9a of the torsion bar 9 is separated from the position b and is located on a side of a position c, a torsion in the direction of the arrow γ in FIG. 7(a) is generated in the torsion bar 9.

As shown in FIG. 4, a torsion bar receiving member 7r2 forms a substantially U-shaped space between the torsion bar receiving member 7r2 and the back surface 7r of the tilt floor 7. The torsion bar receiving member 7r2 is fixed to the back surface 7r of the tilt floor 7 by a bolt. The upper edge portion 9a of the torsion bar 9 is loosely fitted into the substantially U-shaped space formed by the torsion bar receiving member 7r2. The upper edge portion 9a of the torsion bar 9 can move in a longitudinal direction of the working vehicle and a vertical direction.

Figure 8:
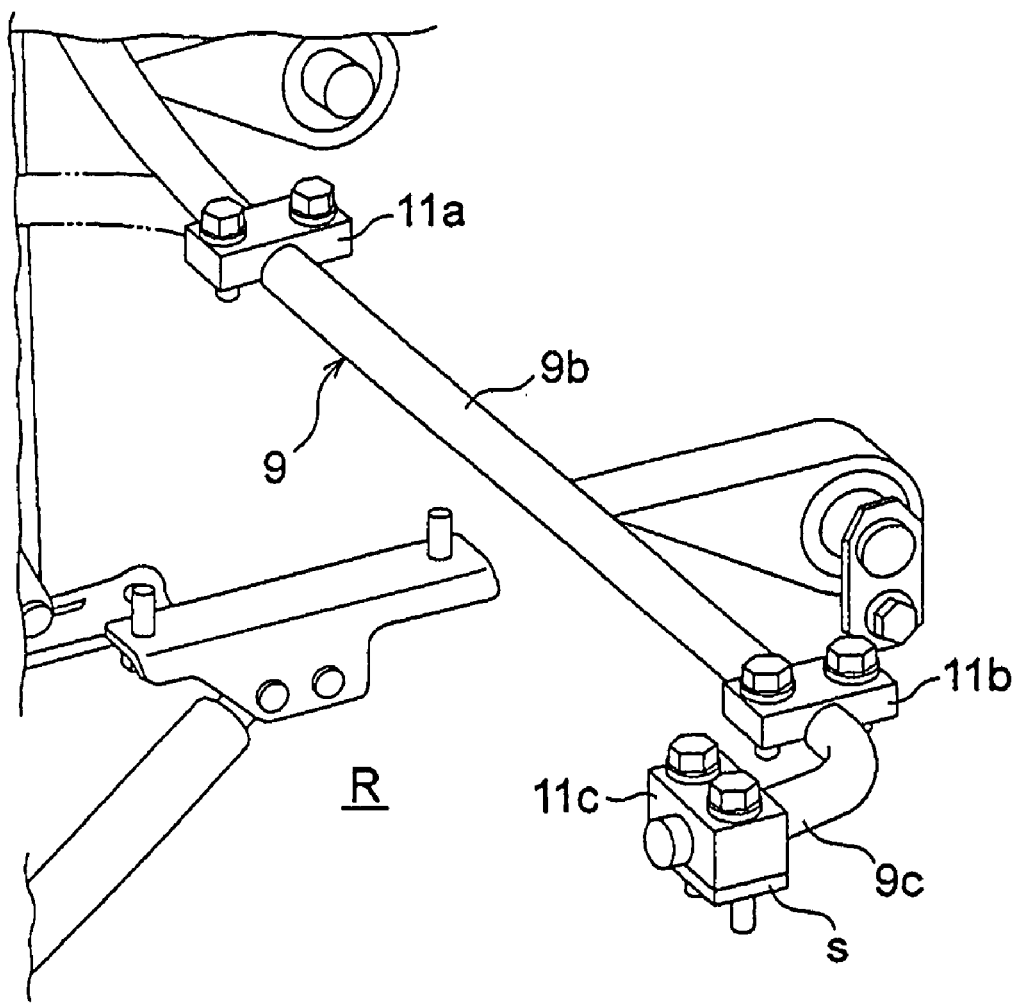
FIG. 8 is a perspective view of the torsion bar shown in FIG. 6 as viewed from diagonally above in a direction A (first embodiment).

When the tilt floor 7 is tilted up or down, an intermediate portion 9b of the torsion bar 9 is twisted and deformed to generate torsion. The intermediate portion 9b is turnably supported on the revolving frame R through torsion bar mounting members 11a and 11b. The torsion bar mounting members 11a and 11b are fixed to the revolving frame R by bolts as shown in FIG. 8 which is a perspective view of FIG. 6 as viewed from diagonally above from the direction A in FIG. 6.

The lower edge portion 9c bent from the intermediate portion 9b of the torsion bar 9 is rigidly fixed to the revolving frame R through a torsion bar fixing member 11c. The torsion bar fixing member 11c is fixed to the revolving frame R by a bolt.

A mounting angle adjusting spacer (mounting angle adjusting means) s of the torsion bar 9 is inserted and fixed between the torsion bar fixing member 11c and the revolving frame R below the torsion bar fixing member 11c. Increasing and reducing the thickness of the spacer s make it possible to change a height position of the lower edge portion 9c of the torsion bar 9 from the revolving frame R.

The mounting angle of the torsion bar 9 can be adjusted by changing the height position of the lower edge portion 9c of the torsion bar 9 with respect to the revolving frame R.

As shown in FIG. 7(a), the position a where the angle θ of the torsion bar 9 with respect to a horizontal plane of the revolving frame R is set, for example, to 37° can be constituted as a neutral position where there is no twisting deformation and torsion is zero, and the position b can be a mounting position as the closed position where the tilt floor 7 is tilted down.

When the tilt floor 7 is tilted up and assumes the maximally opened position, the position c where the angle θ of the torsion bar 9 becomes 50° can be a position in the upper edge portion 9a of the torsion bar 9. Further, the position a which is the neutral position of the torsion bar 9 can be changed by increasing or reducing the thickness of the spacer s. That is, increasing the thickness of the spacer s allows the position a to be moved toward the position c, while reducing the thickness of the spacer allows the position a to be moved toward the position b.

According to the present invention, when the angle θ of the torsion bar 9 is smaller than the neutral position of 37°, the torsion in a direction of the arrow β from the torsion bar 9 can be applied to the tilt floor 9. When the angle θ of the torsion bar 9 is greater than 37°, for example, in the case of the position c where the angle θ of the torsion bar 9 is 50°, the torsion in a direction of the arrow γ can be applied to the tilt floor 9.

That is, the neutral position of the torsion bar 9 of the present invention is set to the intermediate position between the closed position of the tilt floor 7 and the maximally opened position. With this configuration, two kinds of torsion forces in the β direction and γ direction shown with arrows in FIG. 7(a) can be generated in the torsion bar 9 in correspondence to the turning position of the tilt floor 7.

As the configuration of the torsion bar 9, the position where the angle θ of the torsion bar 9 with respect to the horizontal plane of the revolving frame R becomes 37° is the neutral position of the torsion bar 9 where there is no twisting or deformation and the torsion is zero in the above explanation. In the invention, however, the neutral position of the torsion bar 9 is not limited to the case where the angle θ of the torsion bar 9 is 37°, and a position where the angle θ of the torsion bar 9 becomes an appropriate angle can be set as the neutral position of the torsion bar 9.

Figure 9:
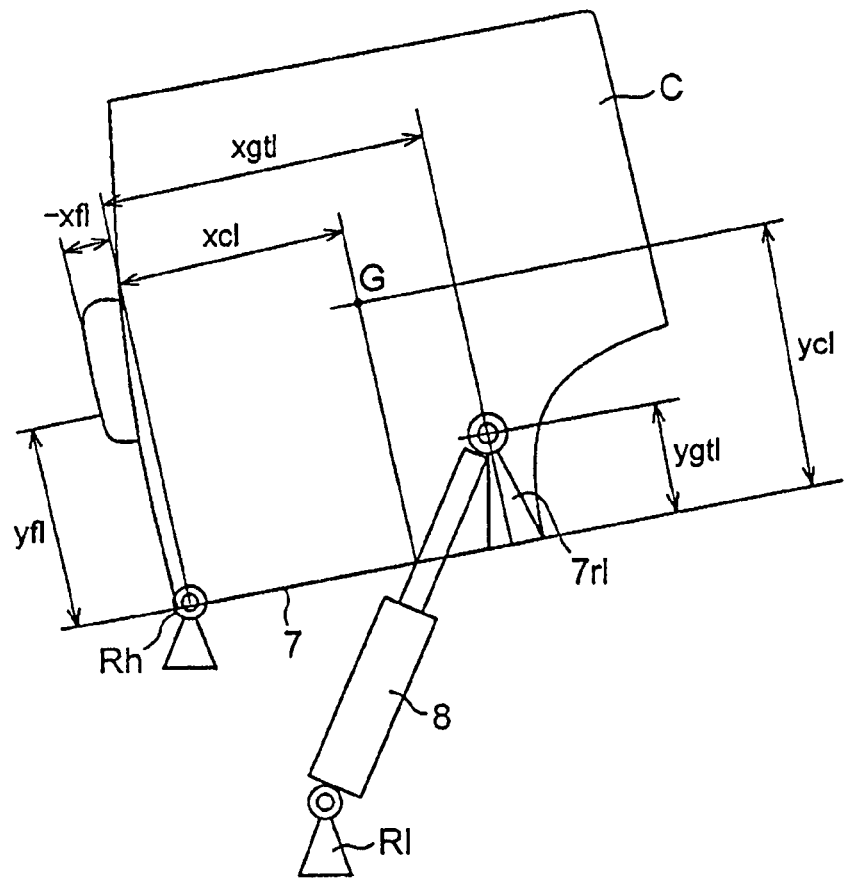
FIGS. 9(a) and 9(b) are side views showing sizes relating a load of tilting action (first embodiment).
Figure 9:
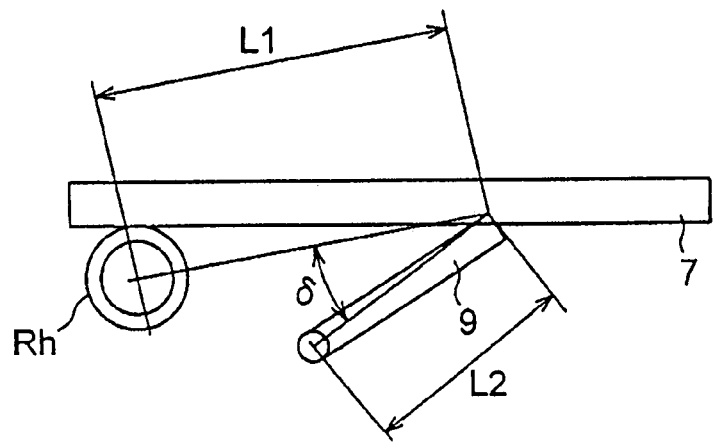

Various moments generated with the hinge mechanism Rh as a center thereof which becomes a tilting fulcrum when the tilt floor 7 is tilted up or down will be explained based on FIGS. 9 and 10.

FIGS. 9(a) and 9(b) are side views showing a distance from the turning center of the hinge mechanism Rh in the hydraulic shovel 1 and a distance between the upper edge portion 9a and the intermediate portion 9b of the torsion bar 9. When the hinge mechanism Rh of the tilting fulcrum is set as the turning center, there are later-described various moments as moments generated around the tilting fulcrum.

That is, examples of the various moments include a moment caused by application of the barycenter G of the tilt floor 7 on which the cab C is disposed, a moment caused by an operation force applied by an operator to the grip g of the cab C, a moment caused by an assisting force with respect to the gas spring 8 on the tilt floor 7, and a moment caused by torsion of the torsion bar 9 with respect to the tilt floor 7.

These moments can be obtained by a distance from application points from the hinge mechanism Rh of the tilting fulcrum and a force in a tangent direction of a circle formed with the hinge mechanism Rh as a center thereof at the application points, i.e., by a product of the moment load. The explanation will be made using a moment load which is a force in the tangent direction of a circle formed with the hinge mechanism Rh as a center thereof at the application points instead of using a moment. The moment load is increased or reduced in correspondence with the tilting angle.

The following explanation of the moment load around the tilting fulcrum is based on a case where distance sizes shown in FIGS. 9(a) and 9(b) are set as follows. That is, when the tilt floor 7 is in the closed position, the position of the barycenter G of the tilt floor 7 on which the cab C is disposed is separated from the hinge mechanism Rh of the tilting fulcrum by xc1=60 cm in the horizontal direction and by yc1=77 cm in the vertical direction.

At that time, the fulcrum position of the bracket 7r1 mounted to the back surface 7r of the tilt floor 7 to which the assisting force of the gas spring 8 is applied, i.e., the application point of the gas spring 8 with respect to the tilt floor 7 (referred to as an application point of the gas spring 8 hereinafter) is separated from the hinge mechanism Rh of the tilting fulcrum by xgt1=30.1 cm in the horizontal direction and by ygt1=5.1 cm in the vertical direction.

At that time, an application point at which an operation force f is applied by an operator to the cab C through the grip g (application point of the grip g, hereinafter) is separated from the hinge mechanism Rh of the tilting fulcrum by −xf1=−13.7 cm in the horizontal direction and by yf1=56.4 cm in the vertical direction.

The right side in FIG. 7(a) from the position of the top dead center with the hinge mechanism Rh of the tilting fulcrum as a center thereof is a positive direction in the horizontal direction while the left side is a negative direction in the horizontal direction, and the positive direction and the negative direction are designated with positive and negative symbols in the horizontal direction.

Further, an application point at which torsion of the torsion bar 9 is applied to the tilt floor 7 at that time (application point of the torsion bar 9, hereinafter) is separated by a distance L1=41.4 to 40.0 cm between the upper edge portion 9a and the intermediate portion 9b of the torsion bar 9, and by a distance L2=34.9 cm from the hinge mechanism Rh of the tilting fulcrum to the application point of the torsion bar 9.

Further, an application point at which torsion of the torsion bar 9 is applied to the tilt floor 7 is defined as an apex, and an angle δ formed between the hinge mechanism Rh of the tilting fulcrum and a center of cross section of the intermediate portion 9b is set to 0.4° to 6.6°.

The tilt floor 7 is tilted up under the above-described conditions. If the various moments generated with the hinge mechanism Rh of the tilting fulcrum as a center thereof are expressed using the above-described moments and loads at the application points, the graph shown in FIG. 10 can be obtained. In FIG. 10, moment loads are calculated which are forces in the tangent direction at the various application points with the hinge mechanism Rh of the tilting fulcrum as a center thereof under the above-described conditions, and a relation of the moment loads and the tilting angle of the tilt floor 7 are shown.

Figure 10:
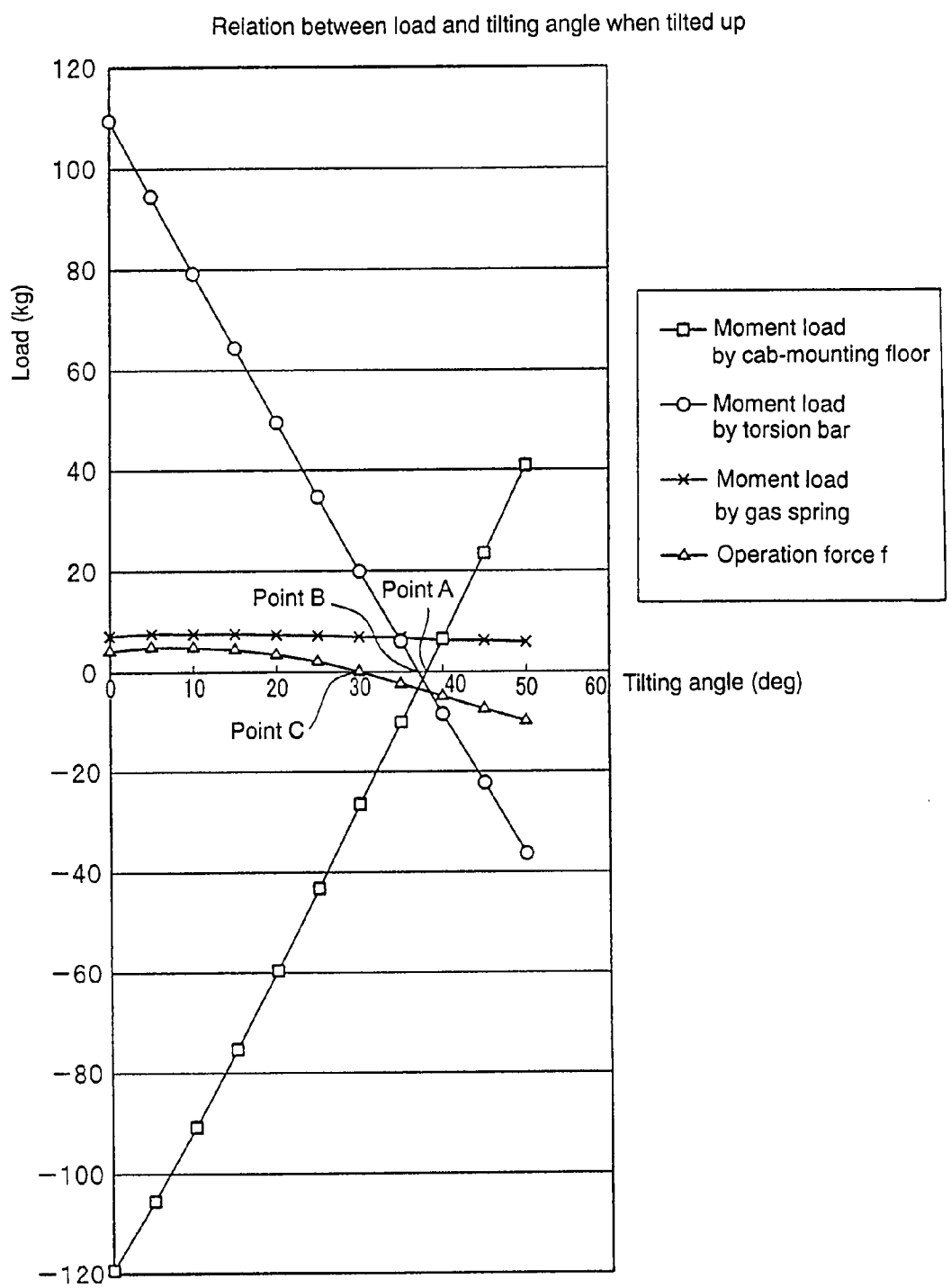
FIG. 10 is a diagram showing a relation between a moment load and a tilting angle when the floor is tilted up (first embodiment).

In the graph shown in FIG. 10, the above-described various moments with the hinge mechanism Rh of the tilting fulcrum as a center thereof are balanced in the tilt angle positions of the tilt floor 7.

A lateral axis in FIG. 10 shows an opening angle of the tilt floor 7, i.e., the tilting angle, and a vertical axis shows moment loads at the application points with the hinge mechanism Rh as a center thereof which is the tilting fulcrum. When the moment loads at the various application points with the hinge mechanism Rh as a center thereof have positive values, the tilt floor 7 is tilted up. When the moment loads at the various application points with the hinge mechanism Rh as a center thereof have negative values, the tilt floor 7 is tilted down.

In FIG. 10, a line "- -" shows a moment load (moment load of the tilt floor 7, hereinafter) with the hinge mechanism Rh as its center, which is generated at the position of the barycenter by the weight of the tilt floor 7 on which the cab C is disposed. When the tilting angle is "0°", the moment load of the tilt floor 7 shows about −120 kg, and is applied in a direction where the tilt floor 7 is tilted down. When the tilting angle which is a point A in FIG. 10 is about 38°, the moment load of the tilt floor 7 becomes "0". This means that at a position where the tilting angle becomes about 38°, the position of the barycenter G of the tilt floor 7 on which the cab C is disposed is in the position of the top dead center with the turning fulcrum of the hinge mechanism Rh which is the tilting fulcrum as its center.

That is, at the position where the tilting angle is about 38°, the turning fulcrum of the hinge mechanism Rh exists in a weight direction passing through the barycenter position of the tilt floor 7, and a force in the tangent direction of the tilt floor 7 is "0". Thus, no force is applied in a direction in which the tilt floor 7 is tilted up or down.

In FIG. 10, the moment load of the tilt floor 7 is applied in a direction where the tilt floor 7 is tilted down in a range where the tilting angle is from 0° to 38°. If the tilting angle which is the point A in FIG. 10 becomes 38°, the moment load of the tilt floor 7 becomes "0".

If the tilting angle exceeds 38°, i.e., if the barycenter position of the tilt floor 7 on which the cab C is disposed exceeds the top dead center, the moment load of the tilt floor 7 is applied in the direction in which the tilt floor 7 is tilted up, and the tilt floor 7 can drop on a side of the maximally opened position by its own weight.

In FIG. 10, the line "-o-" shows a moment load with the hinge mechanism Rh as its center, the moment load being generated at the application point of the torsion bar 9 by the torsion of the torsion bar 9 (moment load of the torsion bar 9, hereinafter). The moment load of the torsion bar 9 is about 112 kg when the tilting angle is "0°", and is applied in a direction where the tilt floor 7 is tilted up.

In the position where the tilting angle shown with the point B in FIG. 10 is 37°, the moment load of the torsion bar 9 becomes "0", and no moment load is applied in the direction in which the tilt floor 7 is tilted up or down.

That is, if the tilting angle becomes 37°, the torsion bar 9 is in the neutral position where there is no torsion deformation and the torsion is "0", no torsion is applied to the tilt floor 7 from the torsion bar 9.

This is applied in a direction in which the tilt floor 7 is tilted up as the moment load of the torsion bar 9 in a range where the tilting angle is "0°" to 37°. At the position where the tilting angle is 37°, no moment load is applied in the direction in which the tilt floor 7 is tilted up or down.

If the tilting angle exceeds 37°, a direction of a torsion force of the torsion bar 9 is reversed, and the moment load of the torsion bar 9 is applied in a direction in which the tilt floor 7 is tilted down.

In FIG. 10, the line "-x-" shows a moment load with the hinge mechanism Rh as its center, the moment load being generated at the application point of the gas spring 8 by the assisting force of the gas spring 8 (moment load of the gas spring 8, hereinafter). As the moment load of the gas spring 8, a substantially constant force is always applied in a direction in which the tilt floor 7 is tilted up.

In FIG. 10, the line "-Δ-" shows a moment load with the hinge mechanism Rh as its center, the moment load being generated at the application point of the grip g by an operator, i.e., an operation force f. The operation force f can be applied in a direction in which the tilt floor 7 is tilted up in a range where the tilting angle is from "0" to 30° which is a point C in FIG. 10.

If the tilting angle becomes 30°, the operation force f becomes "0", and a sum of the moment caused by the torsion bar 9 and a moment caused by the gas spring 8 becomes equal to a moment of the tilt floor 7.

If the tilting angle exceeds 30°, the operation force f should be applied in a direction in which the tilt floor 7 is tilted down. That is, if the tilting angle exceeds 30°, the tilt floor 7 is naturally tilted up even if the operation force f of an operator is not applied to the tilt floor 7. Thus, the tilt floor 7 is retained to a stopper (not shown), and the tilt floor 7 can be tilted up to the maximally opened position.

That is, if the tilting angle exceeds 30°, the tilt floor 7 is naturally tilted up without adding the operation force f to the tilt floor 7. If the tilting angle reaches 50° which is the maximum opening angle, the tilt floor 7 abuts against the stopper (not shown) by its own weight, and the tilt floor 7 is positioned to the maximally opened position.

When an operator tilts up the tilt floor 7 from the closed position in this manner, the operation force f is applied in a direction in which the tilt floor 7 is tilted up until the tilting angle becomes 30°. Consequently, the tilt floor 7 is automatically tilted up even if the operation force f is not applied in a range of the remaining tilting angle of 30° to 50°.

If the tilting angle exceeds 30°, the tilt floor 7 is naturally tilted up without adding the operation force f to the tilt floor 7, and the tilt floor 7 is retained to the stopper (not shown) and the tilt floor 7 can be maintained in its tilt-up state in the maximally opened position.

When the tilt floor 7 is to be tilted down from the maximally opened position, the operation force f should be added in a direction in which the tilt floor 7 is tilted down until the tilting angle becomes 30° from 50° which is the maximum opening angle. If the tilting angle becomes less than 30° while the tilt floor 7 is tilted down, the tilt floor 7 can naturally be tilted down even if the operation force f is not added to the tilt floor 7, and the tilt floor 7 can be tilted down automatically to the closed position.

That is, as shown in FIG. 10, when an operator tilts down the tilt floor 7 from the maximally opened position at which the tilt floor 7 is retained to the stopper, the operator must add the operation force f for tilting down the tilt floor 7 until the tilting angle reaches 30°. However, if the tilting angle becomes smaller than 30°, the tilt floor 7 is naturally tilted down. Thus, the tilt floor 7 can be tilted down and be returned to the closed position even if the operation force is not added.

As apparent from FIG. 10, the tilt floor 7 on which the cab C is disposed can be tilted up and down if an operator simply adds a force of about 10 kg or less as the operation force f.

That is, when the tilt floor 7 on which the cab C is disposed is to be tilted up from the closed position, torsion from the torsion bar 9 acts as the assisting force for tilting up the tilt floor 7, and when the tilt floor 7 is to be tilted down from the maximally opened position, the torsion acts as the assisting force for tilting down the tilt floor 7. Therefore, an operation force required for an operator is small.

Since the neutral position of the torsion bar 9 exists between the closed position and the maximally opened position of the tilt floor 7 in this manner, the operation force f required for tilting up and down the tilt floor 7 falls within the appropriate range.

The facts that the maximum opening angle at which the tilt floor 7 is tilted up is set to 50° as the tilting angle, the neutral position of the torsion bar 9 is set to 37° as the tilting angle and the tilting angle when the operation force f is not applied is set to 30° are only examples. Thus, the present invention is not limited to those angles of the numeric values, and the angle can be adjusted freely by appropriately setting the various moments which act with the hinge mechanism Rh as a center thereof.

Second Embodiment

Another embodiment of the present invention will be explained using FIG. 11. In the second embodiment, as means for obtaining the assisting force when the tilt floor is tilted up and down, only a torsion bar is used instead of using both the gas spring and the torsion bar. Other configurations are the same as those of the first embodiment. Thus, same elements as those of the first embodiment are designated with same symbols, and explanation thereof will be omitted.

In the first embodiment, the gas spring and the torsion bar are used as means for obtaining the assisting force. In the second embodiment, however, a diameter, length and the like of the torsion bar 9 are changed so that the torsion caused by the torsion bar 9 is increased by an amount corresponding to the assisting force caused by the gas spring 8 shown in FIG. 10.

Figure 11:
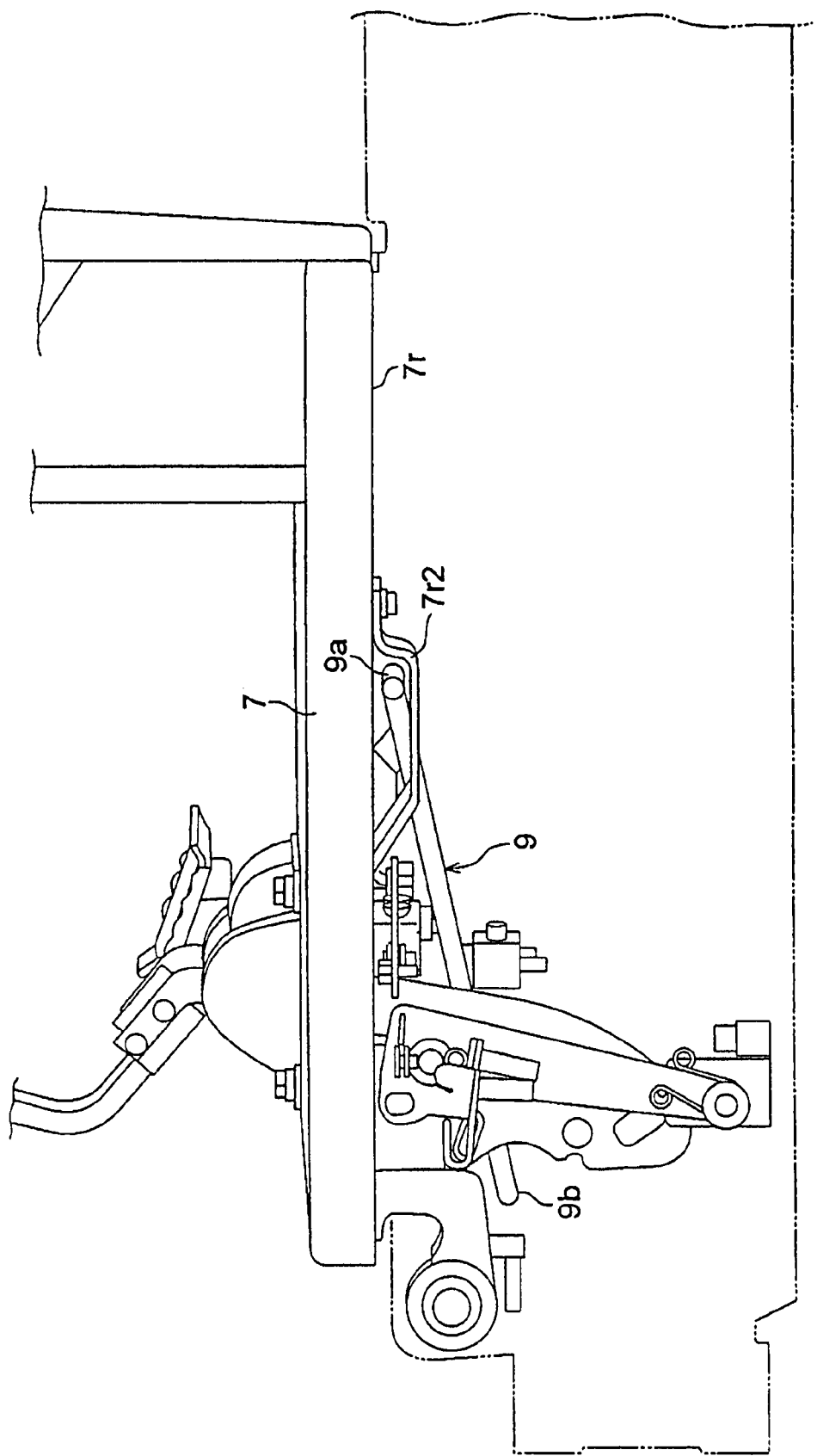
FIG. 11 is a side view of an essential portion below a floor (second embodiment).

Thus, only the torsion bar 9 is used without using the gas spring 8 as shown in FIG. 11.

In the first embodiment, as the operation force f of an operator, as shown in FIG. 10, it is necessary to apply the operation force f in a range of the tilting angle of "0°" to 30° when the tilting up operation of the tilt floor 7 is started. When the tilting down operation of the tilt floor 7 is started, it is necessary to apply the operation force f in a range of the tilting angle of 50° to 30°.

In contrast, in the second embodiment, it is necessary to always apply the operation force f of the operator while the tilt floor 7 comes to the maximally opened position from the closed position when the tilt floor 7 is tilted up.

When the tilt floor 7 is tilted down from the maximally opened position, the tilt floor 7 is tilted down to the closed position even if the operation force f of the operator is not added. Thus, it is necessary to provide a mechanism for locking the tilt floor 7 at the maximally opened position. On the contrary, the locking mechanism is not always necessary in the closed position.

It is possible to change an operation force f of an operator such that the operation force f falls within a desired range by changing magnitude of a moment caused by torsion of the torsion bar 9, by changing magnitude of a moment caused by the gas spring 8, by changing magnitude of a moment caused by a load of the tilt floor 7 on which the cab C is disposed, by changing mounting positions of the torsion bar 9 and the gas spring 8, and by changing the turning fulcrum position of the tilt floor 7 on which the cab C is disposed.

In the second embodiment, it is possible to change an operation force f of an operator such that the operation force f falls within a desired range by changing magnitude of a moment caused by torsion of the torsion bar 9, by changing magnitude a moment caused by the weight of the tilt floor 7 on which the cab C is disposed, by changing the mounting position of the torsion bar 9 and by changing the turning fulcrum position of the tilt floor 7 on which the cab C is disposed.

Figure 12:
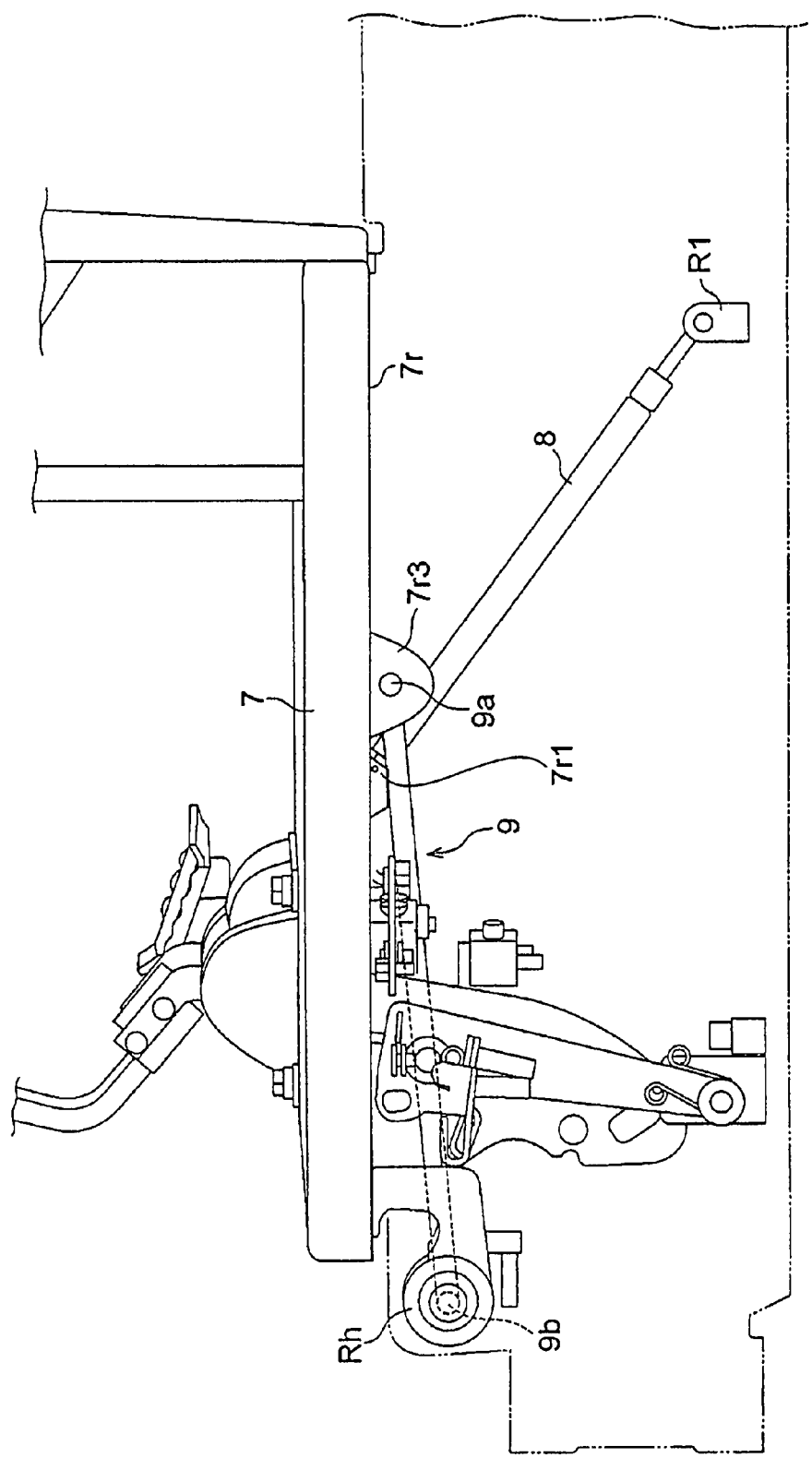
FIG. 12 is a side view of an essential portion of a modification below the floor (first and second embodiments).

In the above-described embodiment, as shown in FIGS. 4 and 5, the upper edge portion 9a of the torsion bar 9 is loosely fitted into the torsion bar receiving member 7r2 fixed to the tilt floor 7, but the intermediate portion 9b of the torsion bar 9 may be coaxially disposed with the hinge mechanism Rh as shown in FIG. 12.

By employing the configuration shown in FIG. 12, the upper edge portion 9a of the torsion bar 9 can be turnably supported by a mounting bracket 7r3 fixed to the tilt floor 7. When the opening angle of the tilted-up tilt floor 7 is set to, for example, 50°, the tilt floor 7 can sufficiently be tilted up even if the hydraulic shovel 1 is small having the weight of 1.5 tons or less. With this, it is possible to ensure a sufficient operation space in which maintenance of the engine 60 and the like can smoothly be carried out.

According to the first embodiment of the present invention, the torsion bar 9 is disposed in addition to the gas spring 8 in order to obtain the assisting force for tilting up and down the tilt floor 7. Therefore, even if the position of the barycenter G of the tilt floor 7 which is tilted up and on which the cab C is disposed exceeds the top dead center of turning motion around the turning fulcrum of the hinge mechanism Rh from the tilted-down closed position, it is possible to smoothly and easily tilt down the tilt floor 7 without applying an excessive load to an operator by a pushing down force of the torsion bar 9.

According to the invention, the tilt floor 7 is provided with the receiving member 7r2 to which the upper edge portion 9a of the torsion bar 9 is loosely fitted, the intermediate portion 9b of the torsion bar 9 is turnably supported by the revolving frame R, and the lower edge portion 9c of the torsion bar 9 is fixed to and supported by the revolving frame R. This configuration makes it possible to arbitrarily select the mounting position of the torsion bar 9, and also to obtain a mounting structure of the torsion bar 9 having a high freedom degree of design.

A height position of the lower edge portion 9c of the torsion bar 9 with respect to the revolving frame R can be changed by adjusting the thickness of the spacer s for adjusting the mounting angle of the torsion bar 9. For this reason, it is possible to adjust the mounting angle of the torsion bar 9 to change the assisting force caused by the torsion of the torsion bar 9 and to change the neutral position of the torsion bar 9 by changing the thickness of the spacer s.

INDUSTRIAL APPLICABILITY

Although the hydraulic shovel is described as the working vehicle in the embodiments, the working vehicle having the tilt floor according to the present invention can effectively be applied to other working vehicles than the hydraulic shovel having the similar configuration.

For example, the present invention can also be effectively applied to a crawler dump truck, a bulldozer, agricultural machinery and the like which are working vehicles other than the hydraulic shovel.

The invention claimed is:

1. A working vehicle with a tilt floor, comprising:
a torsion bar having one end mounted on a base frame, which is a structural member of the working vehicle and the other end mounted on a tilt floor, in which the tilt floor can be tilted up and down centering on a turning center which is supported by the base frame, wherein
a position of a maximally opened position when the tilt floor is tilted up is a position where a barycenter of the driving room and the tilt floor combined together is past a vertical line which passes through the turning center from a tilt down side,
a neutral position of the torsion bar which is in a condition without any torsional deformation is between a closed position where the tilt floor is tilted down so as to control the turning of the tilt floor from turning further when the tilt floor is tilted down and a position where the barycenter is positioned along the vertical line,
a receiving member into which an upper edge portion of one end side of the torsion bar is loosely fitted is disposed on the tilt floor,
an intermediate portion of the torsion bar is turnably supported by the base frame, and a lower edge portion of another end side of the torsion bar is fixed and supported by the base frame, and
a gas spring which assists a tilting up operation and a tilting down operation of the tilt floor is disposed between the base frame and the tilt floor.

2. The working vehicle with a tilt floor according to claim 1, wherein mounting angle adjusting means capable of adjusting a mounting angle of the torsion bar by changing a height position of the lower edge portion of the torsion bar relative to the base frame is disposed between the base frame and the torsion bar.

* * * * *

UNITED STATES PATENT AND TRADEMARK OFFICE
CERTIFICATE OF CORRECTION

PATENT NO. : 8,096,608 B2  
APPLICATION NO. : 11/883131  
DATED : January 17, 2012  
INVENTOR(S) : Takenobu Andou, Katsumi Yokoo and Shinichi Itou Page 1 of 1

It is certified that error appears in the above-identified patent and that said Letters Patent is hereby corrected as shown below:

On the Title page, Item [86] should read:

PCT No.: PCT/JP2006/301430

Signed and Sealed this  
Second Day of July, 2013

Teresa Stanek Rea  
*Acting Director of the United States Patent and Trademark Office*